United States Patent
Aljets

(10) Patent No.: US 9,452,821 B2
(45) Date of Patent: Sep. 27, 2016

(54) FLAP ARRANGEMENT FOR A WING OF AN AIRCRAFT AND AN AIRCRAFT WITH A WING COMPRISING SUCH A FLAP ARRANGEMENT

(71) Applicant: Airbus Operations GmbH, Hamburg (DE)

(72) Inventor: Sascha Aljets, Oldenburg (DE)

(73) Assignee: Airbus Operations GmbH (DE)

( * ) Notice: Subject to any disclaimer, the term of this patent is extended or adjusted under 35 U.S.C. 154(b) by 121 days.

(21) Appl. No.: 14/280,812

(22) Filed: May 19, 2014

(65) Prior Publication Data

US 2014/0346282 A1    Nov. 27, 2014

(30) Foreign Application Priority Data

May 22, 2013   (EP) .................................. 13168685

(51) Int. Cl.
| | |
|---|---|
| *B64C 9/00* | (2006.01) |
| *B64C 9/32* | (2006.01) |
| *B64C 9/04* | (2006.01) |
| *B64C 9/10* | (2006.01) |
| *B64C 13/28* | (2006.01) |
| *B64C 9/16* | (2006.01) |
| *B64C 9/18* | (2006.01) |

(52) U.S. Cl.
CPC . *B64C 9/04* (2013.01); *B64C 9/10* (2013.01); *B64C 9/16* (2013.01); *B64C 9/18* (2013.01); *B64C 13/28* (2013.01); *Y02T 50/32* (2013.01)

(58) Field of Classification Search
CPC ............. B64C 9/04; B64C 9/10; B64C 9/16; B64C 9/18; B64C 13/28
See application file for complete search history.

(56) References Cited

U.S. PATENT DOCUMENTS

| 2,557,426 | A | * | 6/1951 | George | B64C 13/00 244/82 |
|---|---|---|---|---|---|
| 3,528,632 | A | | 9/1970 | Miles et al. | |
| 3,921,942 | A | * | 11/1975 | Bracka | B64C 9/16 244/87 |
| 4,431,149 | A | | 2/1984 | Brislawn et al. | |
| 4,765,572 | A | * | 8/1988 | Bellego | B64C 13/28 244/178 |
| 5,651,513 | A | * | 7/1997 | Arena | B64C 9/04 244/215 |
| 5,913,492 | A | | 6/1999 | Durandeau et al. | |
| 6,257,528 | B1 | | 7/2001 | Brislawn | |
| 2010/0019083 | A1 | | 1/2010 | Llamas Sandin et al. | |
| 2010/0308162 | A1 | | 12/2010 | Gartelmann | |
| 2011/0226345 | A1 | | 9/2011 | Bushnell | |

FOREIGN PATENT DOCUMENTS

GB   2 164 905 A   4/1986

OTHER PUBLICATIONS

European Search Report (EP 13 16 8685)(Oct. 30, 2013).

* cited by examiner

*Primary Examiner* — Philip J Bonzell

(74) *Attorney, Agent, or Firm* — Lerner, David, Littenberg, Krumholz & Mentlik, LLP

(57) ABSTRACT

A flap arrangement for a wing of an aircraft includes a base member, at least one first flap, at least one second flap and at least one connecting assembly. The first flap is movably supported on the base member and the second flap is movably supported on the first flap. The connecting assembly is mechanically coupled with the base member and the second flap and is designed to move the second flap relative to the first flap when the first flap is moved relative to the base member. Due to the resulting forced guiding of a second flap relative to a first flap a separate actuator for moving the second flap and linkages extending outside of the shape defining contour of the flap arrangement may substantially be eliminated.

10 Claims, 5 Drawing Sheets

FLAP ARRANGEMENT FOR A WING OF AN AIRCRAFT AND AN AIRCRAFT WITH A WING COMPRISING SUCH A FLAP ARRANGEMENT

TECHNICAL FIELD

The invention relates to a flap arrangement for a wing of an aircraft and an aircraft with such a flap arrangement.

BACKGROUND OF THE INVENTION

For enhancing the lift or increasing the aerodynamic drag of an aircraft, commonly adjustable flaps located along a leading edge or a trailing edge of a wing are used. Aside from slats and slotted flaps or spoilers, relatively narrow, elongate trailing edge flaps exist, which are also known as "Gurney Flaps" or "Mini-Trailing Edge Devices" (Mini-TEDs). Often, these are preferably arranged on the lower side of the wing in the region of the wing trailing edge and are adapted to be pivoted between a horizontal position, i. e. parallel to the direction of flow, and a substantially perpendicular position. In the latter, the Mini-TEDs extend in a perpendicular manner from the lower side of the wing into the flow surrounding the aircraft.

For extending or retracting mini-trailing edge devices, separate actuators are used, which are coupled to the mini-trailing edge devices by means of an arrangement of levers or rods, which are covered by appropriate fairings for reducing the aerodynamic impact.

BRIEF SUMMARY OF THE INVENTION

The use of dedicated actuators to drive mini trailing edge devices results in an additional weight of the aircraft. Further, linkages from actuators to control surfaces that need to be covered by fairings may add additional drag to the aircraft. The use of a plurality of mini-trailing edge devices at trailing edge regions of a flap system may result in a plurality of necessary actuators, linkages and, consequently, to a plurality of fairings. Hence, it may be desirable to provide a flap system for a wing of an aircraft that leads to the least possible additional weight and aerodynamic drag and, at the same time, that has at least the same reliability.

A flap arrangement for a wing of an aircraft is proposed, the flap arrangement comprising a base member, at least one first flap, at least one second flap and at least one connecting assembly. The first flap is movably supported on the base member. The second flap is movably supported on the first flap. The connecting assembly is mechanically coupled with the base member and the second flap and is designed to move the second flap relative to the first flap when the first flap is moved relative to the base member.

The base member may be any part or component of the flap arrangement that allows for providing a spatially fixed reference position relative to the respective aircraft that comprises a wing and a flap arrangement according to the invention. The base member may be a separate component or be integral to a structure of the aircraft such as a rib, a spar, a support or any other component.

The first flap may be any component that is supported movably in relation to the base member. In commercial aircraft, the first flap may be a part of a Fowler flap arrangement or a slat arrangement, adapted for either providing a rotating/swiveling motion or a combined translational motion and a swiveling motion. The support of the first flap may be realized by a hinge and/or a carriage track and/or a chain of a plurality of links, e.g. a four-link-chain, wherein the drive is realized by a rotary or linear actuator.

The second flap may be any flap suitable for being arranged at the first flap and capable of being moved relative to the first flap with a certain degree of freedom. For example, the second flap may preferably be designed for conducting a mere swiveling motion, e. g. through the use of a hinge, wherein the corresponding hinge line is placed in a spatially fixed position in or along the first flap. As a result, the second flap may support the flap arrangement to increase the camber by swiveling about the hinge line.

Further, the at least one connecting assembly may be designed to include any suitable means for coupling the second flap with the base member such that a precise kinematical chain is created between a fixed point on the base member and, preferably, a fixed point on the second flap. By this measure, a reliable deflection of the second flap relative to the first flap may be conducted when the first flap is moved. For providing such a kinematical chain the connecting assembly may consist of at least one rigid element, such as a push rod, a lever, a tube or a linear element being flexible in at least one dimensional extension, such as a wires, a steel rope, a tape or any other similar element. It goes without saying that the design of the connecting assembly depends on both the motion of the first flap and of the second flap.

One of the basic concepts behind the flap arrangement according to an embodiment of the invention lies in the restraint or forced guiding of a second flap relative to a first flap, when the first flap conducts a motion relative to the base member. Hence, if it is considered advantageous to provide a first flap and a second flap connected thereto and if the second flap should only then be extended when the first flap is extended, such an automatic interconnection or coupling of motions is extremely advantageous. A separate actuator for moving the second flap may be eliminated completely. Besides the clear weight advantage also linkages extending outside of the shape defining contour of the flap arrangement may substantially be eliminated, too. Consequently, separate fairings for covering these linkages may be very small or may be not necessary at all, which results in a clear reduction of the overall drag of the aircraft and vortex creation.

Through an appropriate design of the connecting assembly, a predetermined relation between motions of the first flap and the second flap may be adjusted to predominant requirements. The necessary design of the connecting assembly and an attachment position on the base member thereby primarily depends on the motion trajectory of the first flap. For example, a necessary linkage at the base member or the distance of the base member and an edge of the first flap is to be dimensioned larger when the first flap conducts a translational motion additional to a pure swiveling motion around a fixed hinge line arranged in or directly at the base member.

In an advantageous embodiment, the first flap is a high lift flap arrangeable on a trailing edge of a wing, wherein the second flap is a tab swivably arranged at a trailing edge of the first flap. The base member is rigidly couplable to or constitutes a part of a structural part of a wing. A high lift flap may be a Krueger flap or similar, while its efficiency may clearly be increased by arranging a swivable tab, which constitutes a mini-trailing edge device, on its trailing edge. Hence, when the first flap is extended, the second flap deflects due to the mechanical constraint of the connecting assembly, such that the camber of the first flap is increased automatically.

It may be beneficial that the flap arrangement comprises a shaft and at least one deflection unit. The shaft at least partially extends along a main extension direction of the first flap and is rotatably supported relative to the first flap. The at least one deflection unit is coupled with the shaft such that it follows its rotation motion. The deflection unit is adapted for deflecting the second flap relative to the first flap on rotation of the shaft relative to the first flap. Providing a shaft along the main extension direction of the flap allows to completely cover or surround the shaft without having it to extend outside the wing contour and without sacrificing the aerodynamic quality of the wing. Through the use of a deflection unit, such as a lever or arm, the rotational motion of the shaft may be converted into a translational or longitudinal motion. Consequently, a very compact setup of the flap arrangement is achieved.

A further benefit is achievable by another advantageous embodiment, which comprises a plurality of deflection units coupled with the shaft mentioned above, which deflection units are arranged inside a hollow space of the first flap. In case a flap comprises a plurality of second flaps, such as a plurality of small trailing edge devices ("Mini TEDs") distributed along a trailing edge of the first flap, these may be actuated by a single shaft, such that the total weight of the flap arrangement according to the invention may be decreased to a minimum. By adapting or adjusting the individual deflection units, different extension characteristics of the second flaps along the trailing edge of a first flap or along the trailing edge of the wing in general may be achieved.

In another advantageous embodiment, the deflection unit comprises a first lever having a first end and a second end. The first lever is coupled with the shaft at the first end, extends perpendicularly to the rotational axis of the shaft and is coupled with a connecting rod extending from the second end of the first lever through a delimiting face of the first flap to a linkage member of the second flap. The delimiting face may preferably be a plane in a downstream, slipstream direction and aligned perpendicularly to the surrounding flow of the first flap. Through rotation of the shaft about the rotational axis the first lever is swiveled on a plane perpendicular to the rotational axis of the shaft. Due to the motion of the second end of the first lever, the connecting rod provides a translational motion relative to the rotational axis of the shaft. It goes without saying that the first lever and the connecting rod may be coupled by means of a swivel joint or a ball joint with a degree of freedom of 1 or 2. Consequently, the reliability due to the simple mechanical working principle of the deflection unit is extremely high and the flap arrangement according to the invention is basically maintenance-free.

It may further be advantageous that the push rod at least partially extends through the bottom surface of the first flap. The push rod may be situated as close as possible underneath the bottom surface of the first flap, which may preferably oriented in parallel to the surrounding flow. This allows to drastically increase the slenderness and to decrease the thickness of the trailing edge of the first flap, respectively. A minimum sized fairing is necessary to cover the push rod, which may nevertheless lead to an increased efficiency due to the high slenderness of the first flap.

In a still further advantageous embodiment the shaft is hollow, such that the transferable torque may be adjusted through choosing the diameter of the hollow shaft. As an additional benefit, a further, second shaft may be arranged inside this preferably tubular, hollow shaft for providing a further motion or reference for another group of second flaps.

A still further advantageous embodiment comprises a flexible, linear element having a first end and a second end, wherein the first end is coupled with the base member by means of a tensioning arrangement, wherein the second end is coupled with the second end of the second lever and wherein the tensioning arrangement is adapted for retracting the linear element when the first flap is retracted. The flexible, linear element may be received by a spring-tensioned spindle or by a pull-spring, while a block or end-stop in the tensioning arrangement allows to provide a fixed position of the first end of the linear element during an extension of the first flap. Besides that, this arrangement allows to maintain a certain initial motion of the first flap without moving the second flap between a fully retracted state of the first flap and the position of the first flap where the block or end stop is reached.

In a still further embodiment, the first flap comprises at least one recess at a trailing edge for receiving one of the at least one second flap. The second flap comprises a linkage member facing into the first flap. The second flap may therefore be completely integrated into the outer contour of the first flap in a neutral, retracted position, when the first flap is retracted. By aligning the linkage member facing into the first flap, which means residing inside the first flap or pointing towards the first flap, a fairing for covering the linkage member is not necessary.

In an advantageous embodiment the connecting assembly comprises a rotation unit coupled with the shaft and the base member and is designed for rotating the shaft relative to the first flap on moving the first flap relative to the base member. The rotation unit is responsible for rotating the shaft due to a mechanical constraint between the rotation unit and the shaft, which changes its relative position to the base member once the first flap moves on a predetermined trajectory. Hence, only by moving the first flap, a shaft rotation is induced.

It may be preferred that the rotation unit comprises a lever having a first end and a second end, wherein the lever is coupled with the shaft at the first end and coupled with a connecting rod extending from the second end of the lever (28) to the base member. The second lever preferably extends perpendicularly to the rotational axis of the shaft, such that by moving the second end of the second lever a rotation of the shaft is forced. Hence, due to the arrangement of the shaft inside the first flap, the shaft conducts a translation motion relative to the base member once the first flap is moved. As the connecting rod connected to the second end of the second lever is held in a spatially fixed position of the base member, the connecting rod pulls or pushes the second end of the second lever, due to which a shaft rotation is induced. As a result, without any active means, the shaft may be rotated in order to move all second flaps controlled by the shaft motion in a very energy and weight efficient manner.

The invention also relates to an aircraft comprising a wing and at least one flap arrangement according to the above description and the features of further independent claim.

BRIEF DESCRIPTION OF THE DRAWINGS

Further characteristics, advantages and application options of the present invention are disclosed in the following description of the exemplary embodiments in the figures. All the described and/or illustrated characteristics per se and in any combination form the subject of the invention, even irrespective of their composition in the individual claims or their interrelationships. Furthermore, identical or similar components in the figures have the same reference characters.

DETAILED DESCRIPTION

Figure 1A:
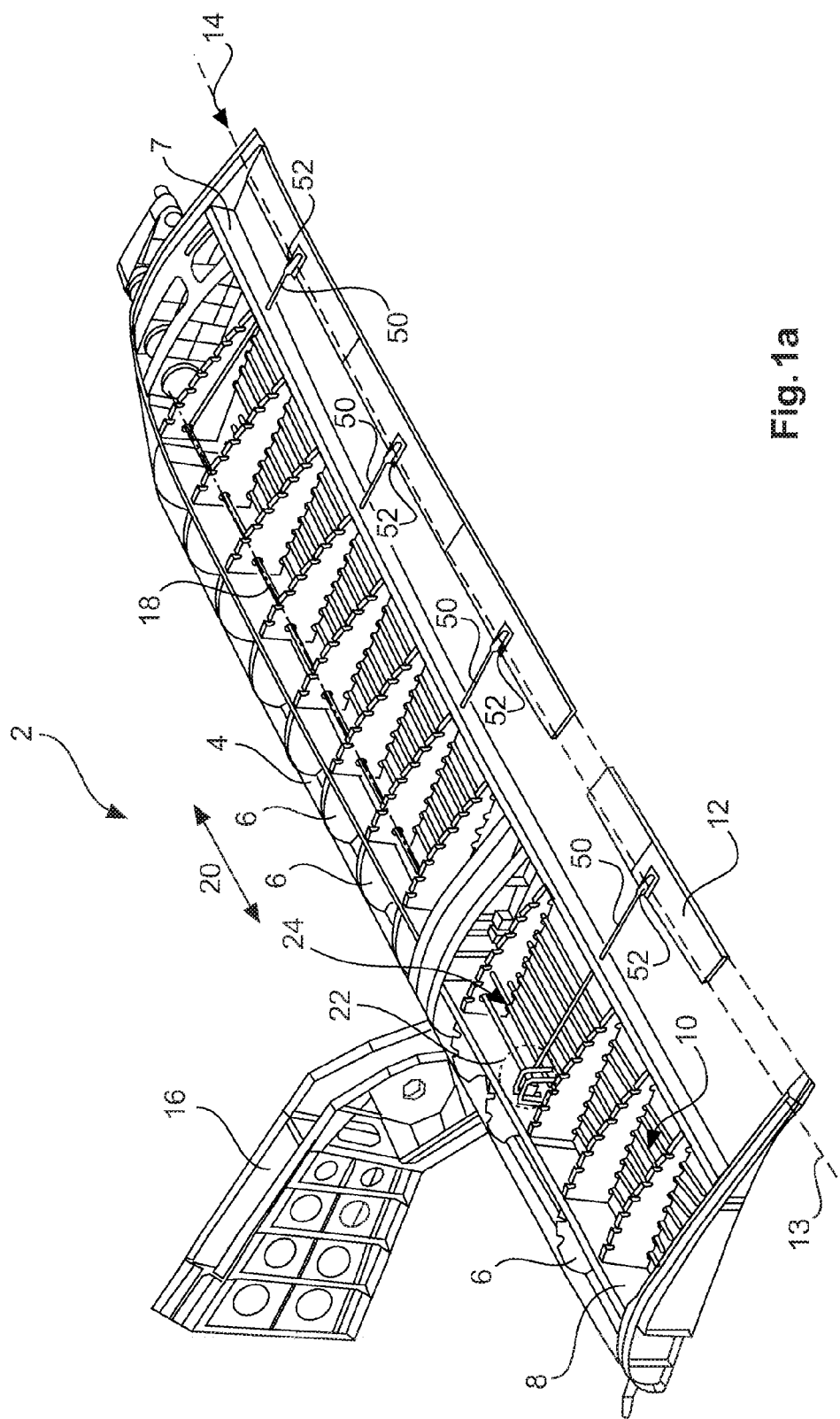
FIG. 1a-1c show a three-dimensional sectional view onto the flap arrangement according to an embodiment of the invention.
Figure 1B:
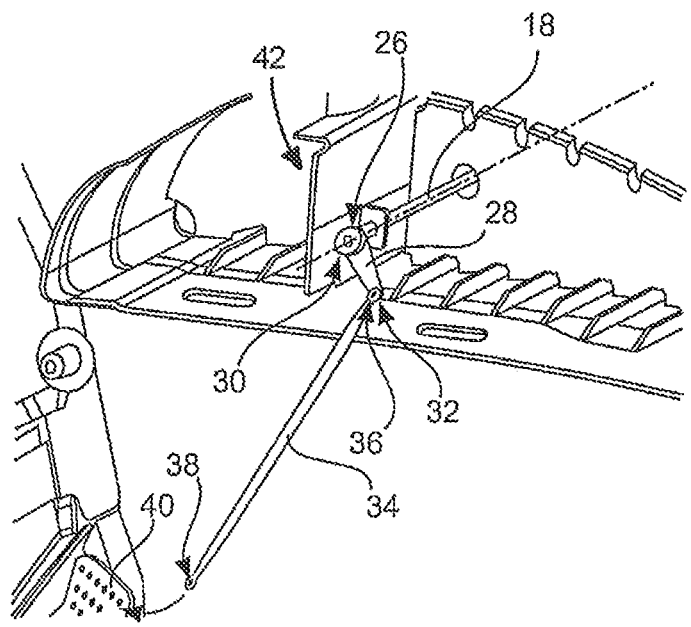
Figure 1C:
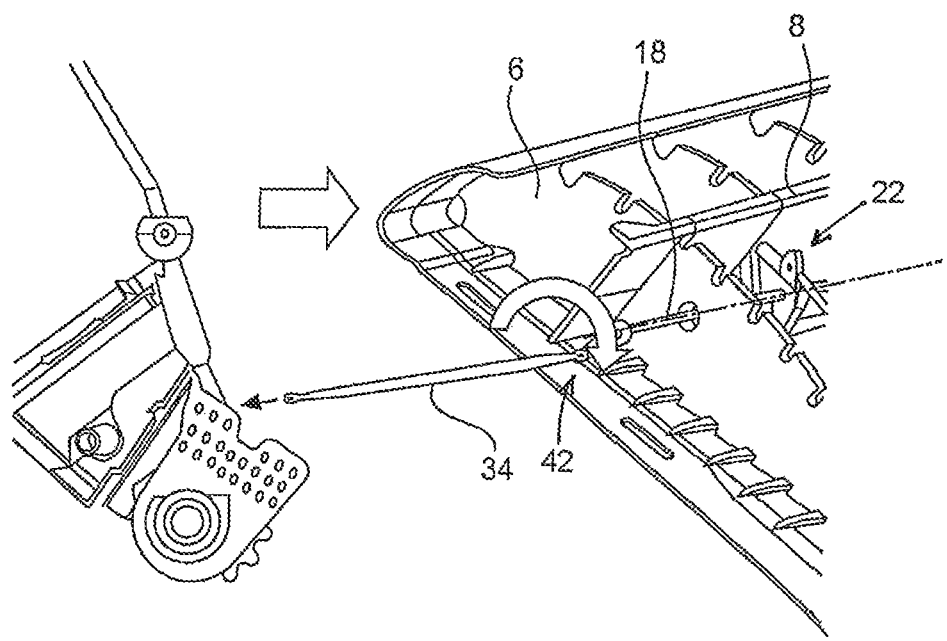

FIGS. 1a-1c show the basic principle of a flap arrangement 2 according to an embodiment of the invention, which exemplarily comprises a first flap 4 with a plurality of ribs 6, a rear spar 7, a front spar 8, a bottom skin 10 and a plurality of second flaps 12, which are realized as mini-trailing edge devices, arranged at a trailing edge region 14 of the first flap 4 and are swivable about a hinge line 13. For the sake of clarity, an upper surface is not shown but it goes without saying that the first flap 4 also comprises an upper surface.

The first flap 4 is movably arranged relative to a base member 16, which is realized as a fixed structure, which is symbolized by a structural component, e.g. a carrier or any other structure rigidly connected to the wing. By means of an appropriate kinematics, which is not depicted in the figures, the first flap 4 follows a predetermined motion trajectory and is driven by an actuating means, which is not shown in the drawings. In FIG. 1a, the first flap is shown in a basically retracted (neutral) position. The second flaps 12 are arranged flushly at the trailing edge region 14, such that the outer contour of a combination of first flap 4 and second flaps 12 equal the outer contour of a common flap without any mini-trailing edge devices attached thereto.

For moving the second flaps 12, a shaft 18 extends substantially along the main extension direction 20 of the first flap 4, which may be parallel to the extension of the front spar 8. For each second flap 12, a deflection unit 22 may be arranged inside a hollow space 24 of the first flap 4 and is coupled with the shaft 18 and a push rod 50, which extends through a delimiting face of the first flap 4, which may be the rear spar 7, and which is coupled to a linkage member 52 rigidly mounted on a corresponding second flap 12. The deflection unit 22, which is shown in more detail in FIG. 1b and the description below, is adapted for transforming a rotating motion to a translating motion in order to deflect the second flaps 12. Hence, by rotating the shaft 18, all second flaps 12 may be extended or retracted relative to the first flap 4. The shaft 18, the deflection unit 22 and the push rod 50 may be defined as components of a connecting assembly between the base member 16 and the second flap 12.

FIG. 1b shows a first end 26 of the shaft 18 which is coupled with a rotation unit 42, which also constitutes a part of the connecting assembly. The rotation unit 42 comprises a second lever 28 with a first end 30 coupled with the shaft 18. A second end 32 of the second lever 28 is connected to a push rod 34. The push rod 34 comprises a first end 36 and a second end 38, wherein the first end 36 is connected to the second end 30 of the second lever 28 and the second end 38 is connectable to a base member 40. It goes without saying, that the shaft 18 is rotatably supported inside the hollow space 24 of the first flap 4 such that it may freely rotate upon an action of the second lever 28. Consequently, by moving the first flap 4 relative to the base member 16, the shaft 18 conducts a translational motion relative to the base member 16. Due to the mechanical constraint, the push rod 34 acts on the second lever 28 and initiates a rotation of the shaft 18 around its rotational axis.

FIG. 1c shows a deflected first flap 4 and a push rod 34, which pulls the second lever 28 and rotates the shaft 18 in a clockwise direction. Consequently, the shaft 18 will initiate the extension motion of all second flaps 12 attached thereto by means of the associated push rods 50.

The flap arrangement 2 therefore is an excellent provision for a combined motion of a first flap and a second flap in a predetermined relationship, while in the present example, the flap 4 represents the first flap and the mini-trailing edge devices 12 represent the second flap.

Figure 2A:
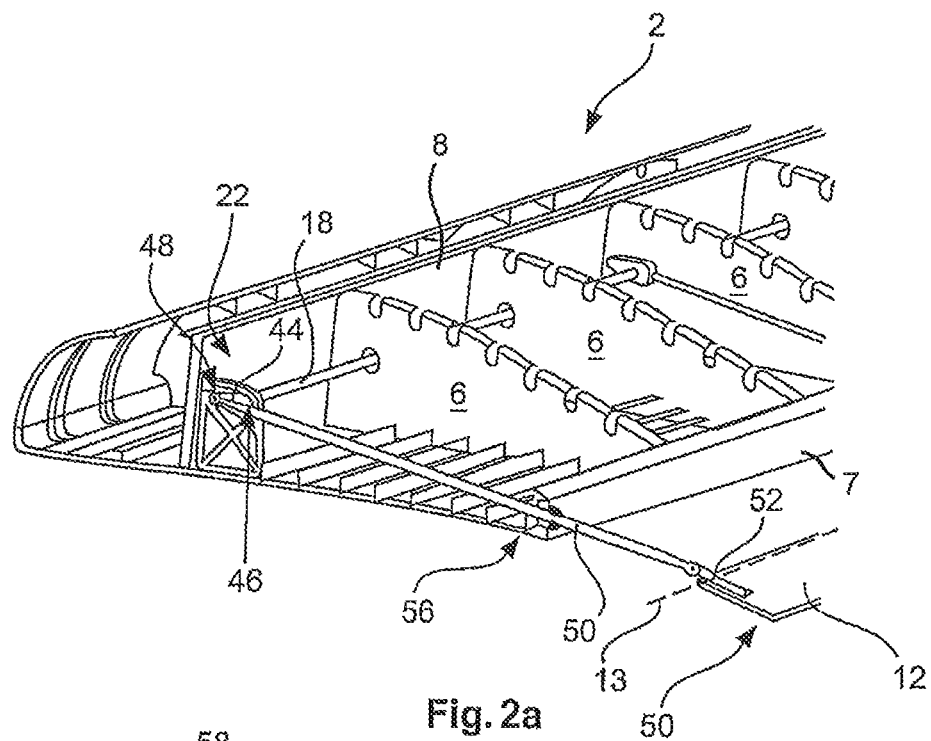
FIGS. 2a and 2b show a detail of a linkage to a second flap as a part of the flap arrangement according to an embodiment of the invention.
Figure 2B:
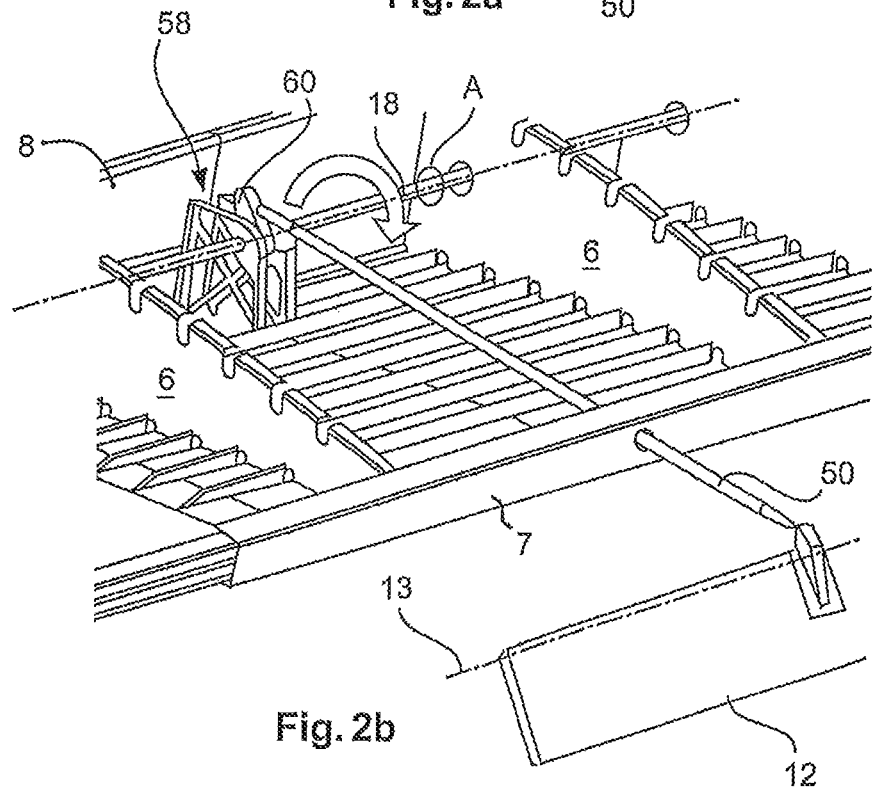

FIGS. 2a and 2b show the flap arrangement 2 and especially the deflection unit 22 in more detail. In FIG. 2a, a deflection unit 22 is shown, which comprises a lever 44 with a first end 46 and a second end 48, wherein the first end 46 of the lever is connected to the shaft 18. The second end 48 is connected to the push rod 50, which acts upon a linkage member 52, facing into the first flap 4. This means, that the linkage member 52 is positioned on an upper side of the second flap 12, which is opposite to a bottom face 54 of the second flap 12, which is positioned flushly to a bottom surface 56 of the flap 4.

Consequently, when the first flap 4 and the second flap 12 are in a retracted position, none of the components necessary for extending the second flap 12 extend outside the contour of the first flap 4. Therefore, a fairing for covering any kinematics is not necessary.

In a variant shown in FIG. 2b, the shaft 18 extends over a deflection unit 58 through a lever 60 arranged therein. It is therefore possible to provide a rotating motion to a plurality of deflection units 58 inside a first flap 4 in order to move a plurality of separate second flaps 12 with the same motion constraint or, as indicated in FIG. 2c, also with a different mechanical constraint.

Figure 2C:
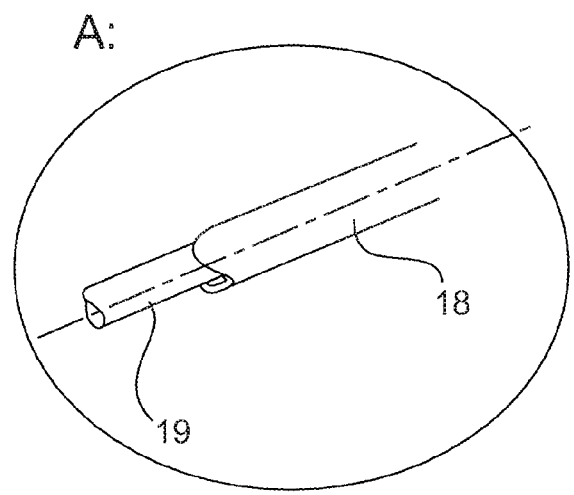
FIG. 2c shows in detail a partial sectional view indicate at "A" in FIG. 2a according to another embodiment of the invention.

A variant of the shaft 18 is shown in a partial sectional view indicated with "A" in FIG. 2b and depicted in more detail in FIG. 2c. It is clearly shown that the shaft 18 may be hollow, wherein the wall thickness of the hollow shaft 18 should be dimensioned to bear the desired torque to be transferred. For providing a different motion relation between first flaps 4 and second flaps 12 an additional shaft 19 may be lead through the hollow shaft 18, which additional shaft 19 may be rotated independently from the hollow shaft 18. Hence, by using the additional shaft 19, two groups of second flaps 12 may be created that move with different characteristics.

Figure 2D:
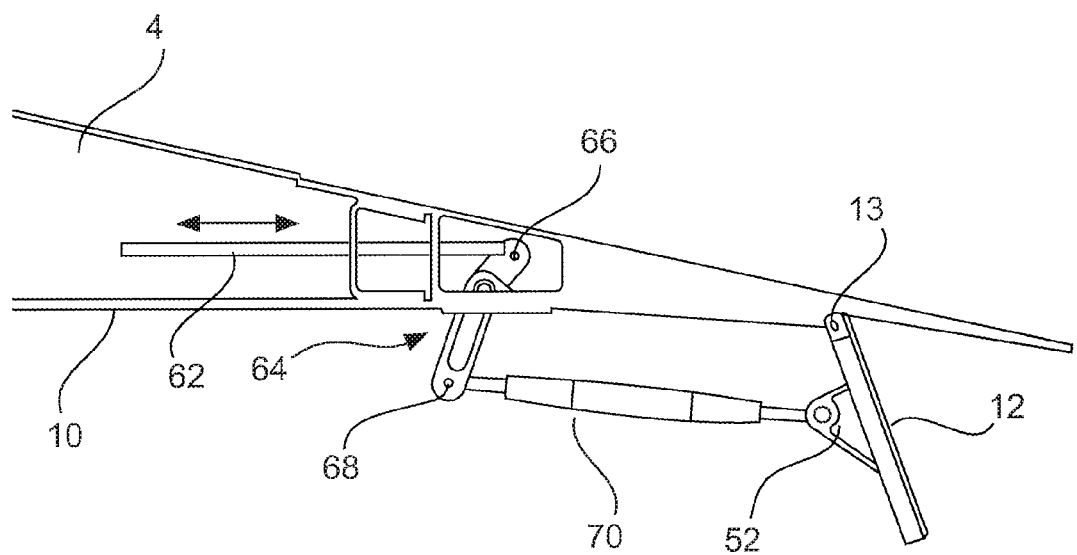
FIG. 2d shows a sectional view of a flap arrangement according to another embodiment of the invention.

Still further, the first flap 4 may be designed more slender if the push rod 50 partially extends underneath the bottom surface 10 of the first flap 4, as demonstrated in FIG. 2d. Here, a first section 62 of a push rod is coupled with an upper end 66 of a bell crank 64, which comprises a lower end 68 coupled with a second push rod section 70 extending to the linkage member 52 arranged on the lower side of the second flap 12 and extends into the surrounding air flow. This allows a very slender design of the trailing edge region of the wing and only requires a very small fairing to just cover the bell crank 68, the second push rod section 70 and the linkage member 52, while the advantageous slenderness clearly outweighs the potential increase in drag due to the small fairing.

Figure 3:
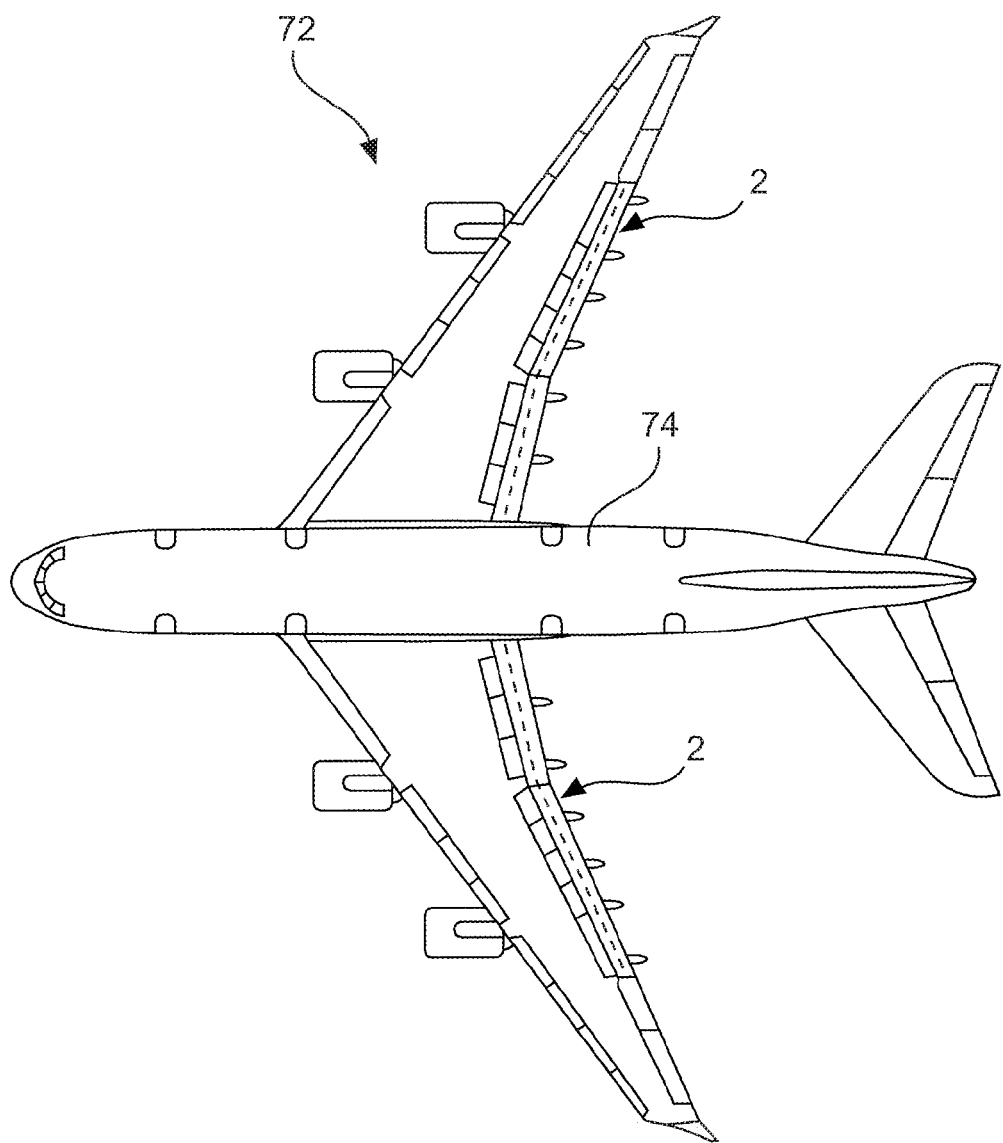
FIG. 3 shows an aircraft equipped with a flap arrangement according to the invention.

Finally, FIG. 3 shows an aircraft 72 having a fuselage 74 and a wing 76 comprising a flap arrangement 2 according to the above description, which clearly increases the efficiency of the high lift system comprising trailing edge flaps.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. A flap arrangement for a wing of an aircraft, comprising:
   a base member;
   at least one first flap;
   at least one second flap;
   at least one connecting assembly;
   a shaft; and
   a plurality of deflection units,
   wherein the first flap is movably supported on the base member,
   wherein the second flap is movably supported on the first flap,
   wherein the connecting assembly is mechanically coupled with the base member and the second flap and is configured to move the second flap relative to the first flap when the first flap is moved relative to the base member,
   wherein the shaft at least partially extends along a main extension direction of the first flap,
   wherein the plurality of deflection units is coupled with the shaft and the second flap and arranged inside a hollow space of the first flap and is configured for deflecting the second flap relative to the first flap on rotation of the shaft relative to the first flap,
   wherein the first flap comprises at least one recess at a trailing edge for receiving one of the at least one second flap, and
   wherein the second flap comprises a linkage member facing into the first flap.

2. The flap arrangement of claim 1,
   wherein the first flap is a high lift flap arrangeable on a trailing edge of a wing,
   wherein the second flap is a tab swivably arranged at the trailing edge of the first flap, and
   wherein the base member is rigidly couplable to or constitutes a part of a structural part of the wing.

3. The flap arrangement of claim 1, further comprising a flexible linear element having a first end and a second end,
   wherein the first end is coupled with the base member by a tensioning arrangement,
   wherein the second end is coupled with the second end of a second lever, and
   wherein the tensioning arrangement is adapted for retracting the linear element when the first flap is retracted.

4. The flap arrangement of claim 1,
   wherein the deflection unit comprises a lever having a first end and a second end,
   wherein the lever is coupled with the shaft at the first end and coupled with a push rod extending from the second end of the lever through a delimiting face of the first flap to a linkage member of the second flap.

5. The flap arrangement of claim 4, wherein the push rod partially extends through a bottom surface of the first flap.

6. The flap arrangement of claim 1, wherein the shaft is a hollow shaft.

7. The flap arrangement of claim 6, wherein a second shaft is arranged inside the hollow shaft for controlling at least one further second flap.

8. The flap arrangement of claim 1, wherein the connecting assembly comprises a rotation unit coupled with the shaft and the base member and is configured for rotating the shaft relative to the first flap on moving the first flap relative to the base member.

9. The flap arrangement of claim 8,
   wherein the rotation unit comprises a second lever having a first end and a second end, and
   wherein the second lever is coupled with the shaft at the first end and coupled with a connecting rod extending from the second end of the second lever to the base member.

10. An aircraft, comprising a fuselage and a wing, the wing comprising a flap arrangement comprising:
    a base member;
    at least one first flap;
    at least one second flap;
    at least one connecting assembly;
    a shaft; and
    a plurality of deflection units,
    wherein the first flap is movably supported on the base member,
    wherein the second flap is movably supported on the first flap,
    wherein the connecting assembly is mechanically coupled with the base member and the second flap and is configured to move the second flap relative to the first flap when the first flap is moved relative to the base member,
    wherein the shaft at least partially extends along a main extension direction of the first flap,
    wherein the plurality of deflection units is coupled with the shaft and the second flap and arranged inside a hollow space of the first flap and is configured for deflecting the second flap relative to the first flap on rotation of the shaft relative to the first flap, and
    wherein the first flap comprises at least one recess at a trailing edge for receiving one of the at least one second flap.

* * * * *